United States Patent
Ortega et al.

(10) Patent No.: US 6,704,624 B2
(45) Date of Patent: Mar. 9, 2004

(54) METHOD AND DEVICE FOR CONTROLLING AN AIRCRAFT MANEUVERING COMPONENTS, WITH ELECTRICAL STANDBY MODULES

(75) Inventors: Jean-Marc Ortega, Blagnac (FR); Jean-Pierre Garcia, Coloniers (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/049,566

(22) PCT Filed: Jul. 12, 2001

(86) PCT No.: PCT/FR01/02275

§ 371 (c)(1), (2), (4) Date: Feb. 15, 2002

(87) PCT Pub. No.: WO02/06908

PCT Pub. Date: Jan. 24, 2002

(65) Prior Publication Data

US 2002/0116096 A1 Aug. 22, 2002

(30) Foreign Application Priority Data

Jul. 13, 2000 (FR) .............................................. 00 09196

(51) Int. Cl.⁷ ................................................ B64C 7/00
(52) U.S. Cl. ............................... 701/3; 701/4; 244/175; 244/75 R; 244/76 R
(58) Field of Search ................... 701/3, 4, 14; 244/175, 244/75 R, 76 R, 195; 342/33

(56) References Cited

U.S. PATENT DOCUMENTS

| | | | |
|---|---|---|---|
| 5,560,570 A | 10/1996 | Pierson et al. | 244/195 |
| 6,059,225 A | 5/2000 | Vidal et al. | 701/3 |
| 6,062,513 A * | 5/2000 | Lambregts | 244/175 |
| 6,077,077 A * | 6/2000 | Geipe | 434/30 |

FOREIGN PATENT DOCUMENTS

FR  2593774  9/1991

* cited by examiner

Primary Examiner—Marthe Y. Marc-Coleman
(74) Attorney, Agent, or Firm—Thelen Reid & Priest LLP (57) ABSTRACT

A device for controlling aircraft maneuvering units includes at least one control unit and a central computing unit. The control unit may be actuated by a pilot for issuing maneuvering commands. The central computing unit is capable of establishing control signals for at least one maneuvering unit from the maneuvering commands. Each central computing unit is being provided with its own failure detection system. The device further includes at least one backup electronic module respectively associated with a maneuvering unit and capable of also establishing control signals for this maneuvering unit from maneuvering commands. The electronic module lacks any failure detection system of its own, but it is connected to a central failure detection system.

17 Claims, 6 Drawing Sheets

METHOD AND DEVICE FOR CONTROLLING AN AIRCRAFT MANEUVERING COMPONENTS, WITH ELECTRICAL STANDBY MODULES

This application is a national phase of PCT/FR01/002275 which was filed on Jul. 12, 2001, and was not published in English.

TECHNICAL FIELD

The present invention relates to a method and a device for controlling maneuvering units of an aircraft.

The invention finds applications notably in the secured control of maneuvering units such as rudders, elevators, air-brake flaps, incidence-adjustable stabilizers as well as brake systems acting on the landing gear, for example.

BACKGROUND OF THE INVENTION

On an aircraft, a certain number of maneuvering units are considered as critical in order to provide security on the course of the craft, both on the ground and in flight. The control system for these units should have a high degree of reliability and availability. In other words, the control should be protected even in the case of failure of one or more components of the system, in order to ensure at least continuation of flight and landing.

For this purpose, at least one main control system and one backup control system are generally associated with each critical maneuvering unit.

On a number of craft, an electrical main control system is used, associated with a mechanical backup system. For instance, this is the case for aircraft of the Airbus A320, A330 or A340 type. On these craft, the backup control for the adjustable horizontal plane as well as for steering is of the mechanical type. More specifically, electrical input actuators drive the mechanical inputs of actuators associated with the adjustable horizontal plane, and of steering actuators, via a linkage system.

In addition to the lack of accuracy from which might suffer a control including a linkage system, mechanical controls require frequent maintenance in order to ensure the absence of any hidden failure.

On the aircraft of the aforementioned type, there is also a backup control of the hydraulic type used for the braking system. In the backup braking system, the brake pedals, which may be actuated by the pilot, act on master cylinders which control the brake shoes via a low pressure hydraulic circuit.

Such a backup system is not free from any damage such as a leak of the hydrostatic transmission and therefore also requires frequent checking. In order to avoid the constraints of mechanical or hydraulic backup control systems, an electrical backup control may also be provided. As an example, on the A320, A330 and A340 aircraft mentioned earlier, transmission of steering commands between the steering unit and the control surface actuators is provided via a plurality of computers. The computers are part of two computing units called primary and secondary units, one of which may be considered as a backup unit. The computers of both computing units are of different design and origin in order to reduce the risk of a design error common to both units.

Each computer is designed in order to be able to detect by itself any fault which would affect its own operation. For this purpose it has a duplex structure of the control/monitoring type, with a control line which establishes control signals for the actuators of control surfaces and a monitoring line which monitors the control line. In the case of any disagreement between both lines, the corresponding computing unit assumes an inactive state so that the second computing unit may assume control of the control surfaces.

Document FR-A-2593774 describes a control device of a control surface wherein the traditional mechanical backup control is replaced by an electro-optical backup system. In this device, the operation of the backup system is independent of the main electrical control system. However, it is not active in the case of normal operation of the main system.

In order to guarantee proper operation of such a device, two solutions are may be contemplated a priori. As the backup system is not active in normal flight, a first solution consists of performing regular tests on the ground, notably during maintenance services. A second solution, retained in the document, consists of providing the backup system with a duplex structure as described earlier, i.e., a structure of the control/monitoring type. Thus, in the case of a failure of the control channel of the backup system, the fault may be detected by the monitoring channel of the backup system.

The second solution enables any failure of the backup control system to be detected in flight, but increases its complexity considerably.

Generally, control devices known in the state of the art, have difficulties related to reliability and/or maintenance requirements of the backup control systems. These difficulties are overcome at least partly, by providing each backup system with a structure enabling its own self-contained control in flight. However, such structures are very expensive and complex.

BRIEF SUMMARY OF THE INVENTION

The object of the invention is to provide a method and a device for controlling maneuvering units, for an aircraft, which do not have the difficulties mentioned above.

In particular, one object is to provide such a device which enables a high level of reliability to be attained whilst having a relatively simple and not very expensive structure as compared with known devices.

Another object is to guarantee proper operation of the device while avoiding ground test and maintenance procedures for backup controls.

Finally, one object is to preserve large autonomy of the main and backup controls.

In order to achieve these objects, the invention more specifically relates to a device for controlling maneuvering units of an aircraft including:

controlling means, which may be actuated by a pilot for issuing maneuvering commands, at least one central computing unit capable of establishing control signals for at least one maneuvering unit from said maneuvering commands, each central computing unit being provided with its own failure detection system.

According to the invention, the device further includes at least one electronic module associated with a maneuvering unit, and capable of also establishing control signals for this maneuvering unit from said maneuvering commands. The electronic module lacks any failure detection system of it own, but is connected to a central system for detecting failures.

Each electronic module is preferably associated with a single maneuvering unit, but may be associated with several maneuvering units.

The term "maneuvering unit" means any unit capable of steering the course of the aircraft in flight or on the ground. In particular, these are units such as mobile surfaces or braking mechanisms.

As the local electronic modules lack any failure detection systems of their own, they may have a simplified structure as compared with traditional backup systems. The existence of a central failure detection system, which may be common to a large number of backup modules, allows them to be relieved from the requirements of proper operation tests performed on the ground.

In a particular embodiment, the central computing unit is programmed in order to establish the control signals according to a law, a so-called elaborate law, and each electronic backup module is programmed according to at least one law, a so-called simplified law, different from the elaborate law and simpler than the latter.

The electronic modules which may elaborate control signals according to simple proportional laws for example, have a particularly reduced size. They may then easily be distributed within the aircraft, according to the maneuvering units which they control, for example near the actuators of these units.

The central computing unit may optionally be intended for a single maneuvering unit, however, in a preferred embodiment of the invention, the central unit is associated with a plurality of the maneuvering units of the aircraft or even all of them.

According to an advantageous enhancement of the invention, the central failure detection system may be one of the computers of the central computing unit. With this, the failure detection function may be achieved in a very economical way. In this case, the electronic modules may, for example, establish control commands without their being directed towards the actuators of the maneuvering unit during normal operation of the central computing unit. However, established control commands may be forwarded to at least one of the computers of the central unit so that this computer may check compliance of these commands either continuously or not.

In order to increase the reliability of the central computing unit, the latter may include at least two redundant computers. The redundant computers are preferably of different design and origin.

Moreover, the computers may have a duplex type structure by being provided with a first computing channel, called a control channel, and with a second computing channel, called a monitoring channel. The monitoring channel is a part of the own failure detection system of the central computing unit.

In order to prevent an operational perturbation from being transmitted over a possible link existing between the backup electronic modules and the central computing unit, used as a failure detection system for the modules, this link may include galvanic insulation means such as opto-coupler means, transformer means, or filter means. The link may also be made with an optical fiber in order to avoid any electrical connection between the modules and the central computing unit. Furthermore, it is possible to assign only one of the computers of the central computing unit to the detection of failures in the backup modules, so that a possibly transmitted perturbation only affects this single computer. Another possible precaution finally consists in providing an interruption in the monitoring of the backup electronic modules during certain phases of flight such as taking-off or landing.

In particular, the device described above may be used for controlling at least one maneuvering unit selected from:

a control surface of the aircraft, an adjustable inclined plane of the aircraft, and a braking system of the aircraft.

The invention also relates to a method for controlling maneuvering units of an aircraft which may be implemented by means of the described device. The method consists of:

establishing first control signals for a plurality of maneuvering units by means of at least one central computing unit provided with its own failure detection system, establishing second control signals by means of a plurality of backup electronic modules associated with a plurality of maneuvering units, respectively, checking for proper operation of at least one computer of the central computing unit and forwarding first control signals to maneuvering units when proper operation is ascertained, and forwarding the second control signals to the maneuvering units associated with the electronic modules, respectively when a malfunction of the central computing unit is ascertained.

As mentioned earlier, checking for proper operation of the electronic modules may be performed by a computer, preferably a single computer from the central computing unit. Checking may be performed either continuously or periodically.

Other features and advantages of the invention will become apparent from the description which follows with reference to the figures of the appended drawings. This description is given as purely illustrative and non-limiting.

DETAILED DESCRIPTION OF EMBODIMENTS OF THE INVENTION

Figure 1:
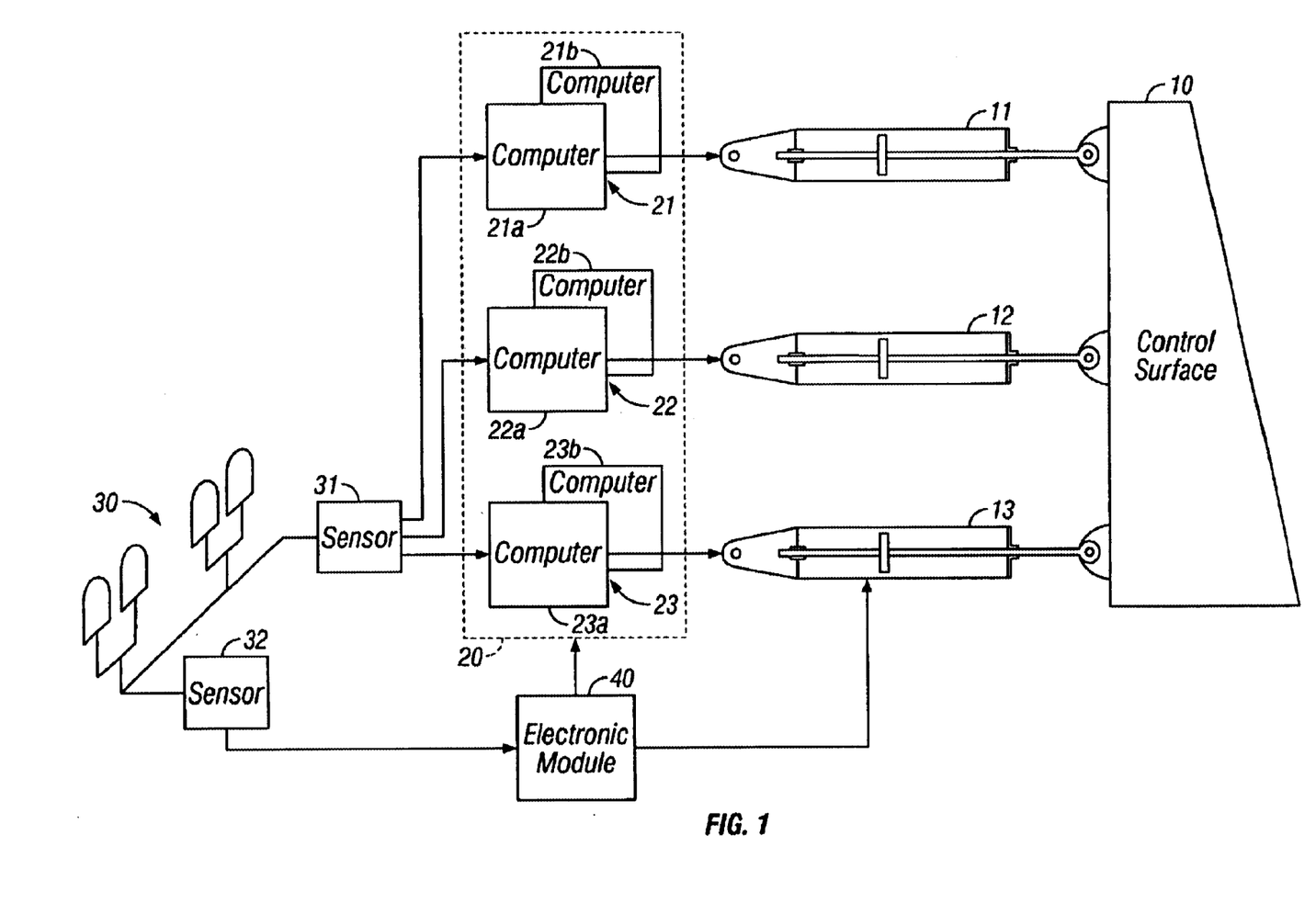
FIG. 1 is a schematic illustration of a first exemplary embodiment of a device according to the invention, for controlling a rudder of an aircraft.

FIG. 1 shows a device for controlling a control surface 10 which may be moved by three actuators 11, 12 and 13. The actuators, the structure of which is described in more detail in the following text, are illustrated in a simplified way. They receive control signals established by a central computing unit 20.

The computing unit comprises three computers 21, 22 and 23 associated with three redundant actuators 11, 12 and 13 in the illustrated example. The computers 21, 22, and 23 may each comprise a double computing structure (21a, 21b, 22a, 22b, 23a, and 23b respectively) with a control channel and a monitoring channel. They establish the control signals from maneuvering commands entered by a pilot on one or several control units such as a rudder bar 30. Moreover, the different computers of the central computing unit are preferably of a different origin and design in order to prevent a same design fault from being able to influence all the computers.

Although this does not appear in the figure, the computers may receive commands from a plurality of control units (rudder bar, joystick, etc.) and deliver control signals to actuators of several maneuvering units (control surfaces . . . ).

In the illustrated example, the maneuvering commands are more specifically delivered to the central computing unit by sensors 31, 32 associated with the rudder bar. Moreover, the computing unit receives a large number of various data, established by sensors which do not appear on the drawing. These data are representative of the parameters and flight conditions of the aircraft, and they enable control signals to be elaborated according to complex computation laws.

The maneuvering commands of sensors 31, 32 of the rudder bar are also delivered to an electronic module basically shown with reference number 40. The electronic module is capable, like the central computing unit, of establishing control signals for the control surface 10. However, these signals are established by taking into account a smaller number of parameters and according to simpler computation laws. In particular, the control signals may be established according to control commands according to a simple proportionality law. It should be noted that unlike the central computing unit, the backup electronic module may be provided for establishing the control signals only for one maneuvering unit. With this feature, the electronic module may be localized more freely for example, near the actuator(s) controlled by the module.

In the example of FIG. 1, the electronic module 40 is only connected with one of the actuators 13 of control surface 10.

Figure 2:
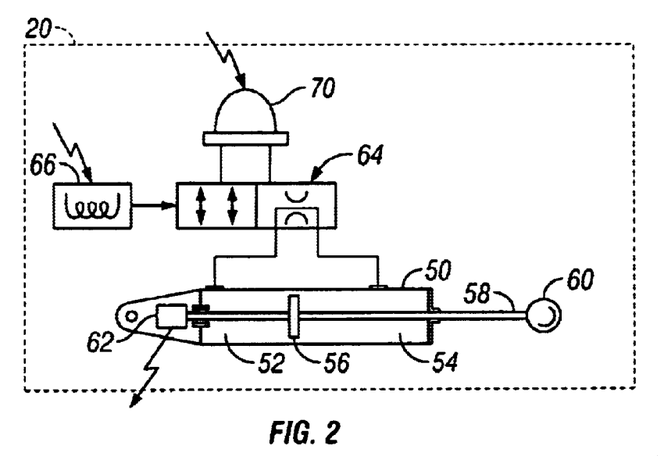
FIGS. 2, 3 and 4 are schematic illustrations of actuators which may be used with the control device according to the invention, for controlling maneuvering units.
Figure 3:
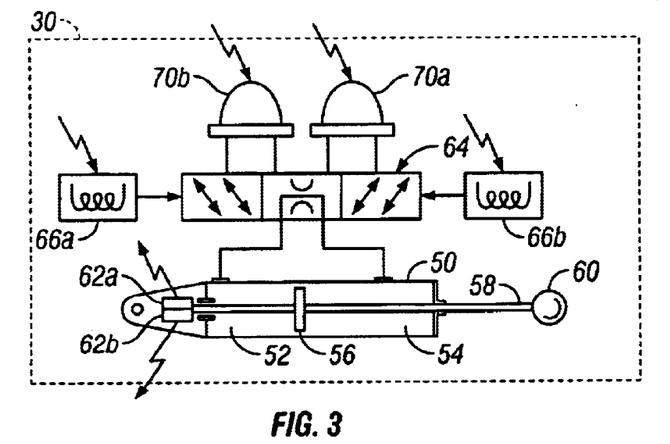
Figure 4:
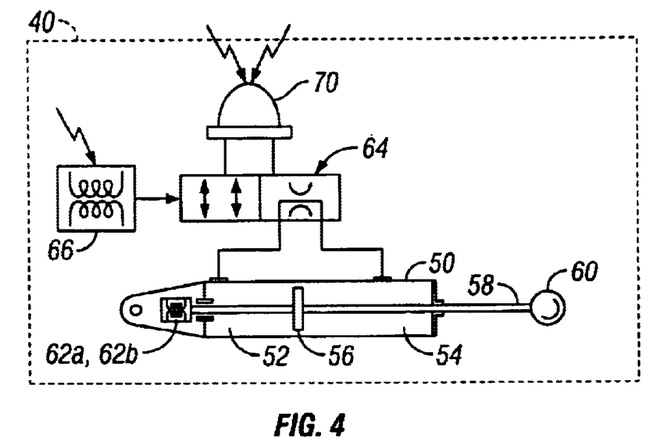

FIGS. 2, 3 and 4 described hereafter show in more detail the structure of actuators which may be used for deflecting a control surface or any maneuvering unit.

The actuators essentially include a cylinder 50 divided into two chambers 52, 54 by a mobile piston 56. One of the ends of a piston rod 58 is mechanically connected to the maneuvering unit (not shown) at a jointed point 60. A second end of the piston rod is connected to a position sensor 62 used for performing servo-control of position. The actuator of FIG. 2 has two operating modes selected by a mode slide 64 actuated by a solenoid valve 66. In a first position of the mode slide, which is the one illustrated in the figure, both chambers of the cylinder are put into communication in such a way that a hydraulic fluid contained in the chambers may flow from one chamber to the other through a restrictor. This position corresponds to a so-called passive mode.

In a second position of the mode slide, chamber 52, 54 of the cylinder are put into communication with a servo-valve 70 which distributes a hydraulic fluid into the chambers according to electrical signals. This position corresponds to a mode called an active mode. The signals may be provided to the servo-valve by a computing unit such as the central computing unit or by an electronic module as mentioned earlier. The same applies to the control signals for the solenoid valve 66. For reasons of simplification, the hydraulic power supply of the servo-valve is not illustrated. Moreover, the electrical control inputs of the solenoid valve 66 and of the servo-valve 70 are simply indicated by twisted arrows.

FIG. 3 shows an actuator which may operate according to three modes, corresponding to the three positions of the mode slider 64. To facilitate the description of FIG. 3, the portions of this figure which are identical, similar or equivalent to those of FIG. 2, are marked with the same reference numbers. Therefore, it is possible to refer to the preceding description of these portions. The mode slide 64 always comprises a passive mode position wherein chambers 52, 54 of the cylinder are put into communication. It further comprises two positions corresponding to active modes. In a first active mode position, the chambers of the cylinder are put into communication with a first servo-valve 70*a*. In a second active mode position, the chambers of the cylinder are put into communication with a second servo-valve 70*b*. It is also observed that the mode slide is controlled by two solenoid valves 66*a* and 66*b*.

The first servo-valve 70*a* and the first solenoid valve 66*a* receive electrical signals from the central computing unit, whereas the second servo-valve 70*b* and the second solenoid valve 66*b* receive electrical signals from the backup electronic module. A solenoid valve control hierarchy is provided and specified later on in the text.

It is further observed that the position sensor is a double sensor with two portions 62*a* and 62*b* for providing position servo-control data to the central computing unit and to the electronic module, respectively.

FIG. 4, which also repeats the same reference numbers for the portions identical with or similar to those of the preceding figures, shows a third actuator structure, which may also receive control signals from two different sources, but which has only one mode slide 64 with two positions. Both positions correspond to the passive and active modes. On the other hand, the servo-valve 70 and the solenoid valve 66 are of the double winding type respectively. In this case, both windings are insulated from each other, and each winding is connected with one of the sources of control signals, respectively, i.e., the central computing unit and the backup module. Both portions 62*a*, 62*b* of the position sensor may also be two distinct and electrically insulated windings.

Figure 5:
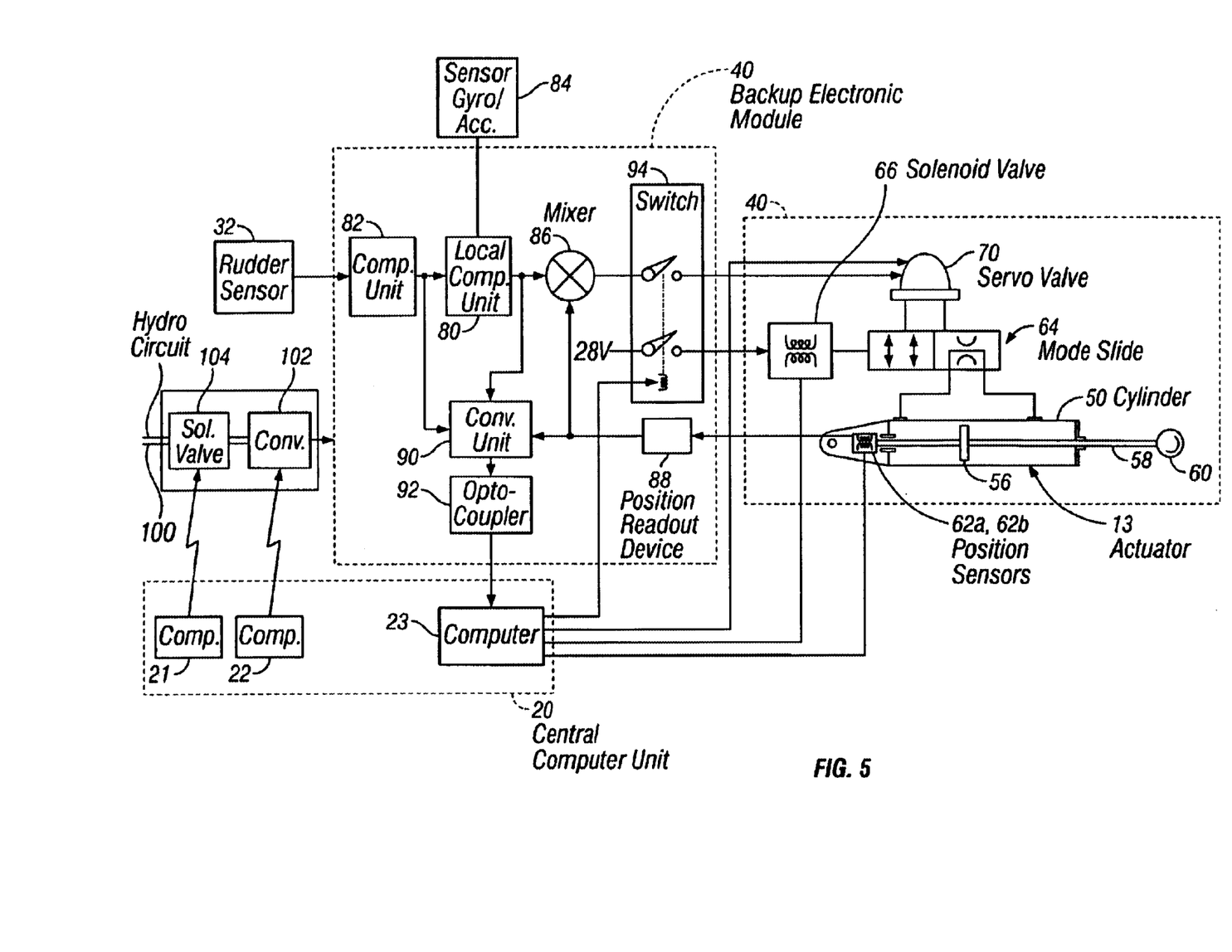
FIG. 5 is a more detailed illustration of certain portions of the device of FIG. 1.

FIG. 5, described hereafter, shows in a more detailed way the operation of the backup electronic module 40. The core of the electronic module 40 is formed by a so-called local computing unit 80, provided for elaborating backup control signals according to a simple proportionality law. It is connected to the sensor 32 of the rudder bar (or any other maneuvering unit), via a unit 82 for reading out maneuvering commands. Accessorily, the local computing unit 80 may also receive data from a gyroscopic sensor or an accelerometer. These sensors are symbolically referred to with reference number 84.

The output of the local computing unit 80, is directed to a mixer 86 which corrects the signal according to the current position of the control surface given by the position sensor 62*b* of the actuator, and which delivers the servo-control signals, for the actuator 13. Reference number 88 refers to a control surface position readout device. The readout device 88 is connected between the position sensor 62*a*, 62*b*, and the mixer 86.

The readout device 88 is also connected to a conversational unit 90 provided for exchanging data between the central computing unit 20 and the backup electronic module 40. The conversational unit 90 is connected to the central computing unit 20 by a galvanic insulation means 92 such as an optocoupler, for example. It transmits to the central computing unit and more specifically to one of the computers 23 of this unit, the position data delivered by the sensor 62*b* mentioned above, but also the control signals elaborated by the local computing unit 80, and/or from the mixer 86 in order to provide monitoring of the electronic module by the central computing unit. The central computing unit may permanently or periodically checked for proper operation of the backup electronic module 40. With a switch 94 driven by the computer 23 assigned to the monitoring of the module, the control signals produced by the module 40 may be isolated or transmitted to the actuator 13.

During normal operation, i.e. in the described example, when all the computers of the central computing unit 20 are not out of order, switch 94 is kept open so that the actuator 13, and more specifically the servo-valve 70, only receive control signals from the central computing unit.

In this case, the mode slide 64 may either be in a passive operating mode wherein the chambers of the cylinder are put into communication, or an active mode. As a reminder here, proper operation of the computers of the central computing unit is self-monitored by the computing unit itself, owing to the duplex type structure of the computers.

On the other hand, when all the computers of the central computing unit fail, switch 94 is no longer kept open. Upon closing, it provides direct transmission of the control signals established by the backup electronic module towards the actuator 13.

It may be observed in FIG. 5 that switch 94 is also connected to the solenoid valve of the actuator for controlling its operating mode. A voltage (28 V) is applied to the solenoid valve 66 in order to put the mode slide 64 into the active mode.

In order to prevent a simultaneous failure of the central computing unit 20 and of the backup electronic module 40 because of their power supply being cut off, these components are preferably powered from different and independent power sources. The central computing unit 20 is powered by one source of electrical power and in this case it is the electrical power supply circuit of the aircraft. The backup electronic module 40 is powered by a power source of hydraulic origin, i.e., from a hydraulic circuit 100 of the aircraft. A converter 102 is provided for converting the hydraulic power supplied by circuit 100 into electrical power which may be used by the module.

With a solenoid valve 104 driven by the central computing unit 20, and more specifically by computers 21, 22 not assigned to the monitoring of the electronic module, the hydraulic fluid supply for the converter 102 may be switched off and the electronic module may therefore be disabled.

The electronic module may thus be driven, for example in the following way:

When the backup electronic module fails, i.e., when it transmits control signals considered to be faulty or when it does not transmit any signals, the failure is detected by computer 23 assigned to the monitoring of the module and this computer controls, via the two other computers 21, 22, the cutting-off of the power supply of the module;

when all the computers of the central unit fail, the backup module 40 is enabled (this point was examined earlier) and when the monitoring computer 23 fails and therefore no longer provides the checking for proper operation of the backup module 40, the other computers of the central computing unit also cut off the power supply of the backup electronic module.

It should be specified that the links existing between the different portions described with reference to FIG. 5 may be electrical links or optical links and that these links are totally segregated, i.e., independent and isolated from each other.

Finally, as the power supply solenoid valve 104 is controlled by two of the computers whereas the third computer controls the signal transmission switch 94, each computer of the central computing unit have the possibility of operazing or forbidding the use of the backup electronic module.

Figure 6:
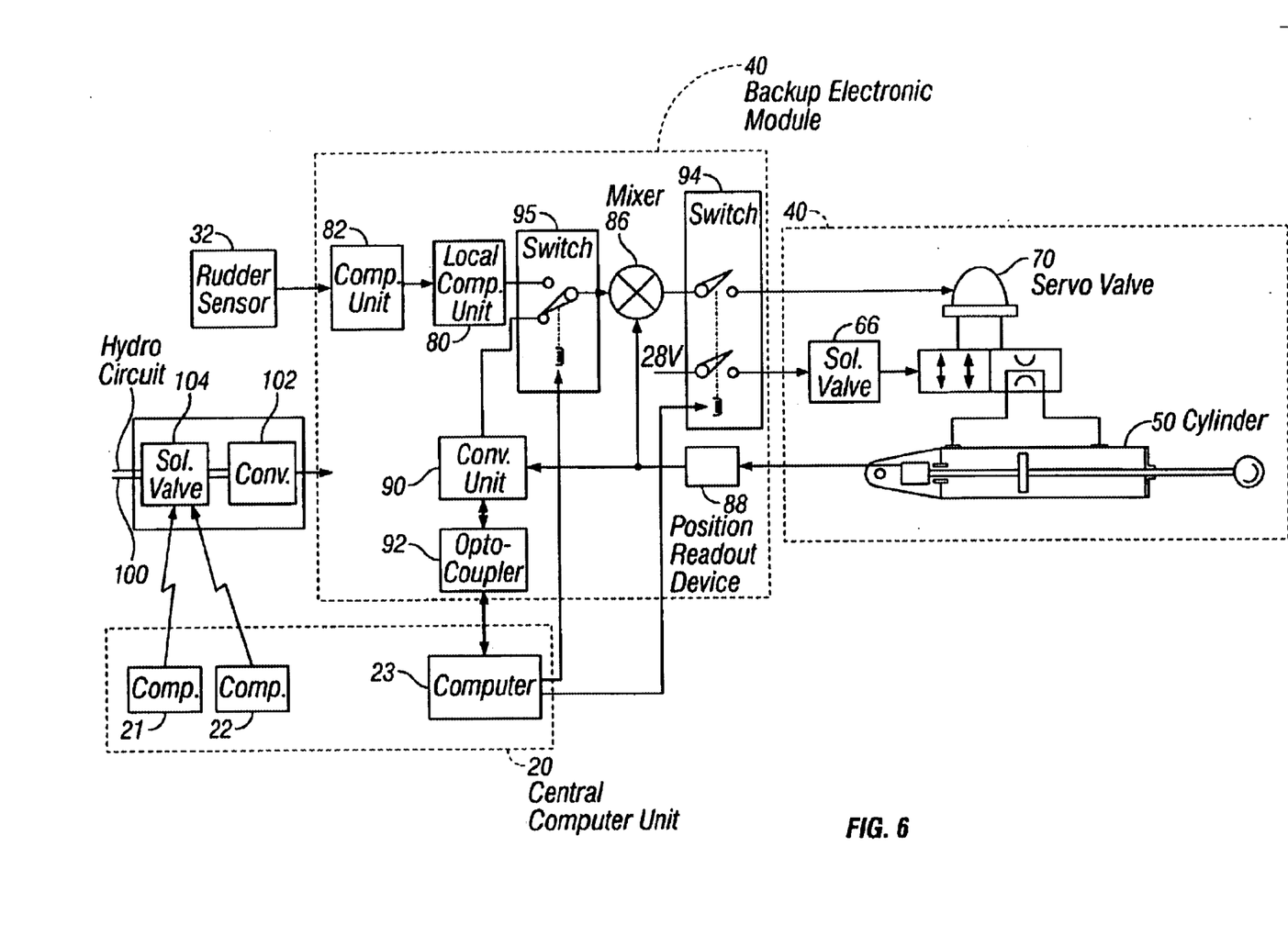
FIG. 6 shows another exemplary embodiment of the portions of the device of FIG. 1.

FIG. 6, described hereafter, shows another possible embodiment of the control device. Because of a large number of similarities between the components of FIG. 5 and those of FIG. 6, the description of these components is not repeated here.

Unlike FIG. 5, it is noted that in FIG. 6 the actuator is no longer of the type of the one described with reference to FIG. 4 but of the type described with reference to FIG. 2. In other words, the actuator only has a single electrical control input both for the servo-valve 70 and the solenoid valve 66. Moreover, the actuator is only connected to the backup electronic module 40, without any direct link with the central computing unit 20. On the other hand, the conversational unit 90 is designed not only for allowing a transfer of data from the backup module 40 to the central computing unit 20, but also for receiving from the central computing unit, control signals for the actuator. Thus, the control signals established by the central computing unit are not forwarded to the actuator directly but through the electronic module. Such an embodiment is particularly suitable when the electronic module is positioned near the actuator or is integrated into the latter.

An additional switch 95, given by the computer 23, assigned to the monitoring of the backup electronic module, enables control signals established by the central computing unit 20 or those established by the local computer 80 of the electronic module to be directed towards the actuator.

In the case of a failure of the central computing unit, the additional switch 95 is no longer energized and automatically directs the signals established by the local computer 81 towards the actuator.

Figure 7:
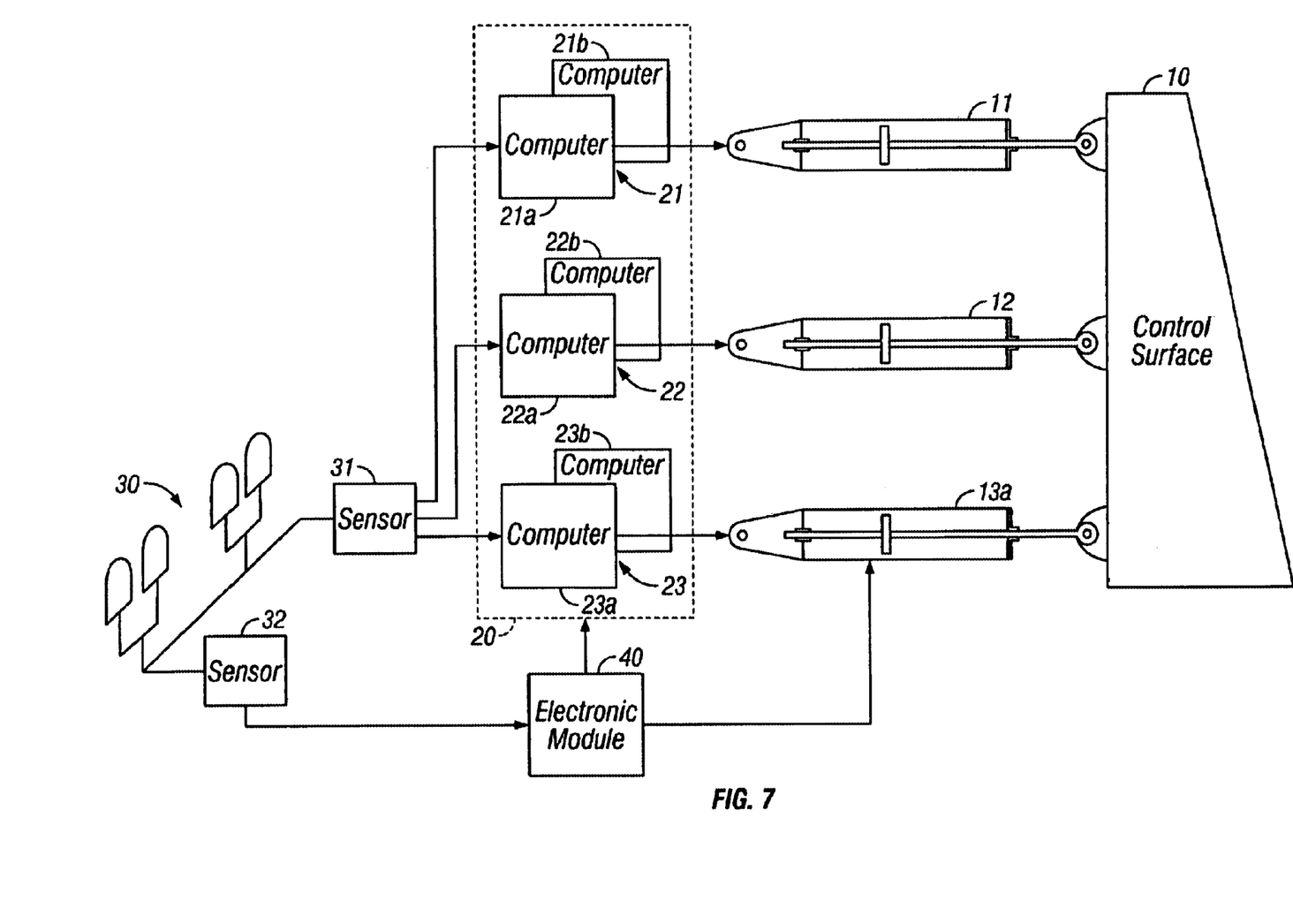
FIG. 7 is a schematic illustration of a second exemplary embodiment of a device according to the invention.

FIG. 7 shows a control device in accordance with FIG. 6 used for controlling a rudder. The components of this figure, are substantially the same as those of FIG. 1 and are marked with the same reference numbers. FIG. 7 shows that two of the actuators are exclusively reserved for being controlled by the central computing unit. These are actuators 11 and 12, whereas the third actuator 13a is only driven by the backup electronic module 40. An architecture in accordance with FIG. 7 does not prevent any permanent or occasional check for proper operation of the backup electronic module, as described earlier. However, when the backup module control signals are not sent to the actuator 13a, the latter is placed in passive mode.

Figure 8:
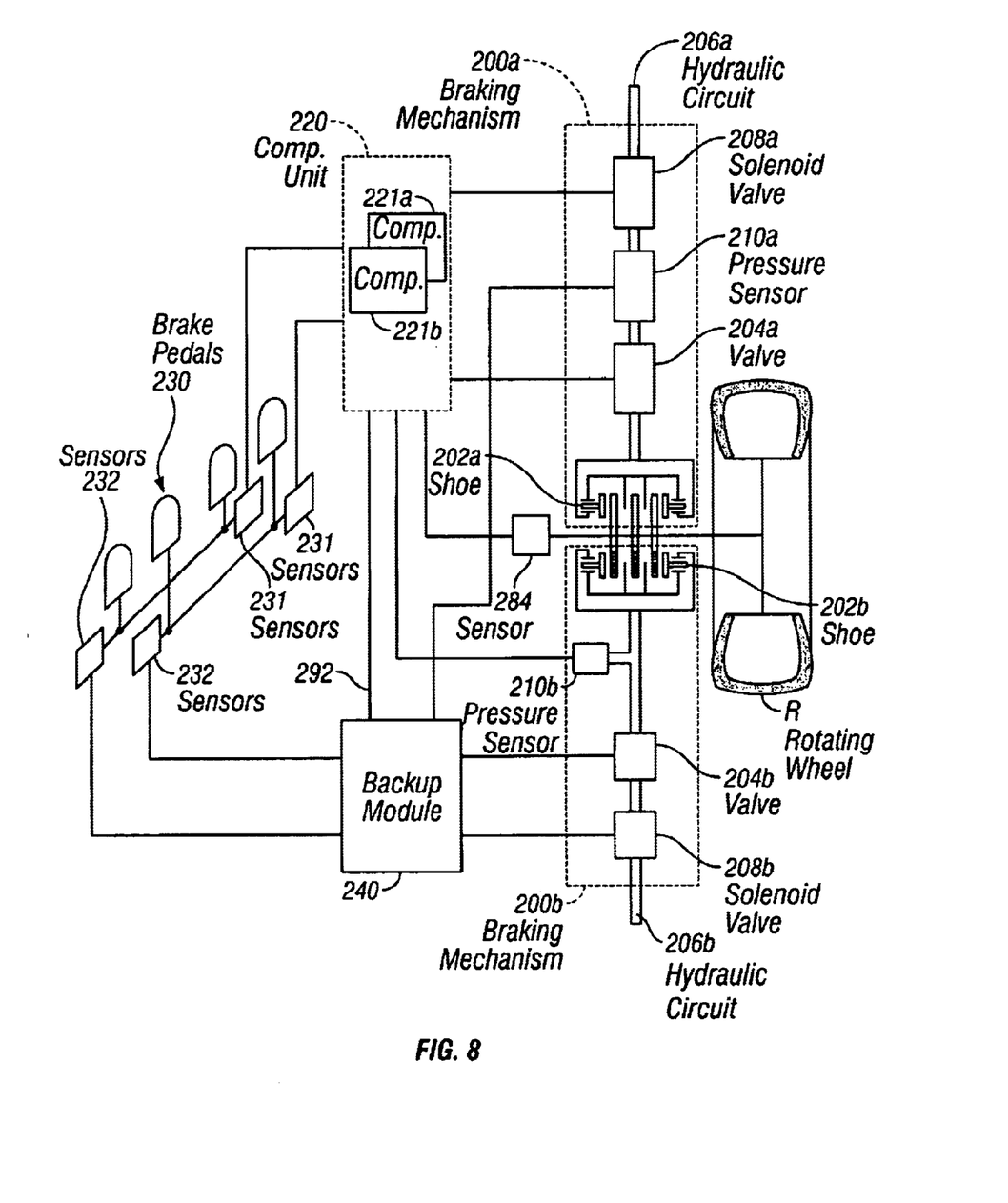
FIG. 8 is a schematic illustration of an exemplary embodiment of a device according to the invention applied to the control of a braking system.

FIG. 8, as described hereafter, illustrates another possible application of a control device according to the invention. The device of FIG. 8 relates to a braking mechanism and in particular to a braking mechanism for an aircraft.

On an aircraft, brakes may be applied to each wheel or wheel train individually and the latter may include several braking devices. In the described example, the braking mechanism includes two devices marked with reference numbers 200a and 200b, respectively. Each braking device includes at least one shoe 202a, 202b capable of applying a first set of discs, so-called "stator" discs, integral with the leg of the landing gear, against a second set of discs, so-called "rotor" discs, integral with the rotating wheel(s) R.

Furthermore, the braking devices each include a valve 204a, 204b connected to hydraulic circuits 206a, 206b, respectively, for exerting a braking force on the shoes via pistons not shown. The valves are connected to hydraulic circuits via a solenoid valve 208a, 208b, respectively capable of cutting off the hydraulic pressure in the case of a failure or a leak. For example the valves are of the servo-valve type or with direct control (DDV/Direct Drive Valve).

Control of the braking devices 200a and 200b of FIG. 8 is provided by a computing unit 220, comparable to the central computing unit of the applications described earlier, and by a backup electronic module 240, respectively.

The computing unit 220 and the backup module 240 are connected to braking and deflection command sensors 231, 232, of a control unit 230 (brake pedals), for receiving braking or deflection control commands. From these commands, they elaborate control signals essentially for the valves but also for the solenoid valves.

The signals elaborated by the backup electronic module 240 may further result from a simple proportionality computation law. On the other hand, the signals elaborated by the computing unit 220 may satisfy a more sophisticated computation law, taking into account for example, tachometric data provided by a sensor 284 detecting the rotational speed of the wheels. These data enable control signals to be established with an anti-skid function for the wheels.

A connection 292 is used for exchanging data between the computing unit 220 and the backup electronic module 240 and in particular for performing the monitoring of proper operation of the backup module by means of the computing unit 220. However, the computing unit 220 includes several computers 221a, 22 1b. or at the very least, computers with self-contained control and monitoring channels in order to perform its own control of operation, according to the invention.

In operation, only the control signals provided by the computing unit 220 are transmitted to the valve 204a of the first braking device. In the case of a failure of the "normal" control, and in particular in the case of a fault in the computing unit 220, the solenoid valve is no longer energized and depressurizes the first braking device 200a.

Depressurization is then detected by a pressure sensor 210a of the first braking device and the electronic module connected to this sensor transmits its control signals to the second braking device 200b.

In the case of a fault in the backup electronic module, the computing unit 220 signals the failure to the flight crew, keeps control and consequently prevents the second braking device from starting to operate.

A pressure sensor 210b is connected to the computing unit 220 and is used for detecting proper operation of the backup line during a test sequence before landing. This test sequence may be controlled by the computing unit 220 through the link 292.

What is claimed is:

1. A device for controlling maneuvering units of an aircraft including:
    at least one control unit (30, 230) which is actuated by a pilot for issuing maneuvering commands;
    at least one central computing unit (20, 220) which establishes control signals for at least one maneuvering unit (10, R) from said maneuvering commands, each central computing unit being provided with its own failure detection system; and
    at least one backup electronic module (40, 240), associated with at least one maneuvering unit, and also establishing control signals for said maneuvering unit from said maneuvering commands, said electronic module lacking any failure detection system of its own, but connected to a central failure detection system.

2. The device according to claim 1, wherein the central computing unit establishes control signals for a plurality of maneuvering units (10).

3. The device according to claim 2, wherein the central failure detection system is a computer (23) of the central computing unit (20).

4. The device according to claim 3, wherein each electronic module (40) is connected to the central computing unit via galvanic insulation means (92).

5. The device according to claim 1, wherein the central computing unit (20) is programmed in order to establish control signals according to a law, called an elaborate law, and wherein each electronic module (40) is programmed according to at least one law, a so-called simplified law, different from the elaborate law.

6. The device according to claim 5, wherein the simplified law is a proportional type law.

7. The device according to claim 1, wherein the central computing unit (20) includes at least two redundant computers (21, 22, 23) the redundant computers being of a different design and origin.

8. The device according to claim 1, wherein the central computing unit (20) includes at least one computer with a duplex type structure, equipped with a first computing channel called a control channel and with a second computing channel called a monitoring channel, the monitoring channel being part of the actual failure detection system of the central computing unit.

9. The device according to claim 1, wherein the central computing unit (20) is connected to maneuvering units via electronic modules (40).

10. The device according to claim 1, wherein the central computing unit (20) and the backup electronic modules (40) are connected to distinct and self-contained electrical power supply sources.

11. The use of a device according to claim 10, for controlling at least one maneuvering unit selected from:
    a control surface of the aircraft,
    an adjustable inclined plane of the aircraft, and
    a braking mechanism of the aircraft.

12. The use of a device according to claim 1, for controlling at least one maneuvering unit selected from:
    a control surface of the aircraft, an adjustable inclined plane of the aircraft, and a braking mechanism of the aircraft.

13. A method for controlling maneuvering units of an aircraft consisting of:
    establishing first control signals of a plurality of maneuvering units by means of at least one central computing unit (20, 220) provided with its own failure detection system;
    establishing second control signal by means of a plurality of backup electronic modules (40, 240) respectively associated with the plurality of maneuvering units, checking for proper operation of at least one computer of the central computing unit (20, 220) and forwarding of the first control signals to the maneuvering units when proper operation is ascertained; and
    forwarding of the second control signals to the maneuvering units associated with the electronic modules, respectively when a malfunction is ascertained.

14. The method according to claim 13, further comprising the checking for proper operation of the electronic modules (40, 240) by means of the central computing unit (20, 220).

15. The method according to claim 14, wherein the checking for proper operation is performed by a single computer (23) selected from several computers of the central computing unit (20).

16. The method according to claim 14, wherein the checking for proper operation is performed continuously.

17. The method according to claim 14, wherein the checking for proper operation is performed periodically.

* * * * *